United States Patent
Deveau et al.

(10) Patent No.: US 9,548,520 B2
(45) Date of Patent: Jan. 17, 2017

(54) ULTRASONIC ELECTROLYTE SENSOR

(71) Applicant: Liebert Corporation, Columbus, OH (US)

(72) Inventors: Edward W. Deveau, Pompano Beach, FL (US); David Stewart, Boca Raton, FL (US); David Popken, Boca Raton, FL (US); Juan Martinez, Miami, FL (US)

(73) Assignee: Liebert Corporation, Columbus, OH (US)

( * ) Notice: Subject to any disclaimer, the term of this patent is extended or adjusted under 35 U.S.C. 154(b) by 751 days.

(21) Appl. No.: 13/889,593

(22) Filed: May 8, 2013

(65) Prior Publication Data
US 2013/0302655 A1 Nov. 14, 2013

Related U.S. Application Data

(60) Provisional application No. 61/645,789, filed on May 11, 2012.

(51) Int. Cl.
*H01M 10/48* (2006.01)
*G01F 23/296* (2006.01)
*H01M 10/12* (2006.01)

(52) U.S. Cl.
CPC .......... *H01M 10/484* (2013.01); *G01F 23/296* (2013.01); *G01F 23/2962* (2013.01); *H01M 10/121* (2013.01)

(58) Field of Classification Search
None
See application file for complete search history.

(56) References Cited

U.S. PATENT DOCUMENTS

| | | |
|---|---|---|
| 4,284,951 A | 8/1981 | Dahl et al. |
| 4,329,406 A | 5/1982 | Dahl et al. |

(Continued)

FOREIGN PATENT DOCUMENTS

| | | |
|---|---|---|
| GB | 2270754 A | 3/1994 |
| JP | 56013647 | 2/1981 |

(Continued)

OTHER PUBLICATIONS

"Alber ELS-Electrolyte Level Sensor and ELSi Interface Module"; at least as of Sep. 11, 2012, 2 pages.

(Continued)

*Primary Examiner* — Paul West
(74) *Attorney, Agent, or Firm* — Harness, Dickey & Pierce, P.L.C.

(57) ABSTRACT

A system is disclosed for monitoring an electrolyte level in a battery cell and generating an indication of a fault condition when the electrolyte level drops below a predetermined acceptable level. The system may make use of a controller, an ultrasonic transmit circuit for transmitting an ultrasonic signal into an interior area of the battery cell, and an ultrasonic receive circuit for receiving the ultrasonic signal after it has been reflected from the interior area of the battery cell. The controller may use the reflected ultrasonic signal and a predetermined calibration signal representing the predetermined acceptable level of the electrolyte to determine when the electrolyte level has dropped below the predetermined acceptable level.

18 Claims, 7 Drawing Sheets

(56) References Cited

U.S. PATENT DOCUMENTS

| | | | |
|---|---|---|---|
| 4,442,700 | A | 4/1984 | Swoboda |
| 5,132,626 | A | 7/1992 | Limuti et al. |
| 5,250,903 | A | 10/1993 | Limuti et al. |
| 5,438,868 | A | 8/1995 | Holden et al. |
| 5,880,364 | A | 3/1999 | Dam |
| 6,412,344 | B1* | 7/2002 | Danicich .............. G01F 23/2968 73/290 V |
| 6,680,994 | B2* | 1/2004 | Jones ...................... G01M 3/24 376/245 |
| 6,828,930 | B2* | 12/2004 | Hagg .................... G01F 23/284 342/118 |
| 6,925,870 | B2* | 8/2005 | Pappas ................ G01F 23/2962 73/290 V |
| 6,938,488 | B2* | 9/2005 | Diaz ..................... G01N 29/024 73/52 |
| 7,812,613 | B2 | 10/2010 | Jones et al. |
| 8,104,341 | B2 | 1/2012 | Lagergren et al. |
| 2002/0083766 | A1 | 7/2002 | Hongerholt et al. |
| 2004/0200267 | A1 | 10/2004 | Koo |
| 2006/0188646 | A1* | 8/2006 | Yun ..................... C23C 16/4482 427/8 |
| 2007/0261487 | A1 | 11/2007 | Sintes et al. |
| 2010/0019773 | A1 | 1/2010 | Son |
| 2010/0278008 | A1* | 11/2010 | Ammar ................... G01S 7/521 367/7 |
| 2011/0183168 | A1* | 7/2011 | Johnnie ............... H01M 10/484 429/93 |

FOREIGN PATENT DOCUMENTS

| | | |
|---|---|---|
| JP | 56133644 A | 10/1981 |
| JP | 56135143 | 10/1981 |
| JP | 56136470 U | 10/1981 |
| JP | 6337284 A | 12/1994 |
| JP | 2000121410 A | 4/2000 |
| JP | 2000205931 A | 7/2000 |
| WO | WO-2004048965 A1 | 6/2004 |

OTHER PUBLICATIONS

Xiong, Wen-qiang et al. "Lead-acid Battery Electrolyte Density Ultrasonic Measurement". Inst. of Electrostatics & Special Power, Dalian University of Technology, Dalian, China; at least as of Sep. 11, 2012, 3 pages.

Liu, Jia-xin et al. "An Ultrasonic Approach to Measure the Density of Battery Electrolyte". Electrical and Control Engineering (ICECE), 2010 International Conference on Jun. 25-27, 2010, 1 page.

Navsea. "Battery Electrolyte Level Detector Apparatus"; at least as of Sep. 11, 2012, 31 pages.

Swoboda, C.A. et al. "Development of an ultrasonic technique to measure specific gravity in lead-acid battery electrolyte". IEEE Trans. Sonics Ultrason, vol. 30:2, Mar. 1, 1983, 2 pages.

"Research for Measuring Specific Gravity of Battery Electrolyte by Ultrasonic". China Papers, Feb. 16, 2010, 2 pages.

* cited by examiner

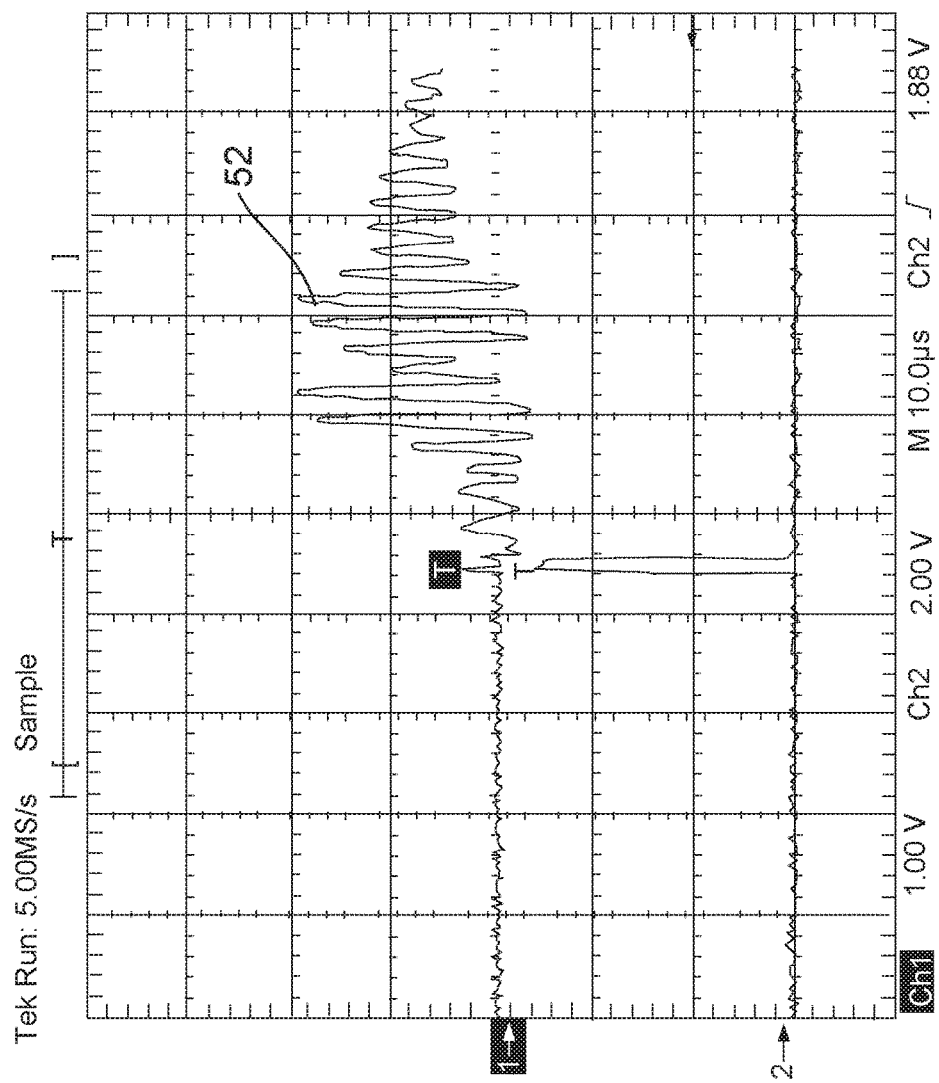

ature and specific examples in this summary are intended for purposes of
ULTRASONIC ELECTROLYTE SENSOR

CROSS-REFERENCE TO RELATED APPLICATIONS

This application claims the benefit of U.S. Provisional Application No. 61/645,789, filed on May 11, 2012. The entire disclosure of the above application is incorporated herein by reference.

FIELD

The present disclosure relates to battery testing, and more particularly to an ultrasonic sensor for detecting an electrolyte level in a battery cell.

BACKGROUND

This section provides background information related to the present disclosure which is not necessarily prior art.

Battery cells have plates surrounded by an electrolyte. When the level of electrolyte in the battery cell drops sufficiently, known as dry out, failure of the battery cell can occur. In battery cells allowing for electrolyte to be added, the battery cells are typically checked periodically and electrolyte added to replace any lost electrolyte. One such type of battery is the lead-acid battery and water is added as needed to keep the electrolyte level at a full level.

Sealed batteries, as the name implies, are sealed and do not allow electrolyte to be added to make up for lost electrolyte. A common type of sealed battery is the valve-regulated lead-acid (VRLA) battery.

It is desirable to monitor the electrolyte level of a battery as a low electrolyte level is an indicator of early dry out of the battery making it more likely that the battery will fail. Also, in batteries where electrolyte can be added, monitoring the electrolyte level allows a user to be alerted when electrolyte needs to be added.

Typical approaches for monitoring electrolyte levels in battery cells are intrusive as they are installed within the cells of the batteries. The inside of a battery cell is a highlight corrosive environment, requiring that the components of the monitoring device installed within the cells be made of material that can withstand this environment. Also, the mechanical design of that part of the monitoring device that is installed within a battery cell is specific to the configuration of the battery cell thus requiring differing mechanical designs for battery cells with different configurations.

Ohmic measurements and capacity testing are other technologies that are used to determine dry out of battery cells. Ohmic measurements often cannot identify that dry out is occurring until it has become severe. Capacity testing is often considered the best method of determining dry out, but the equipment tends to be expensive and the process time consuming.

SUMMARY

This section provides a general summary of the disclosure, and is not a comprehensive disclosure of its full scope or all of its features.

In one aspect the present disclosure relates to a system for monitoring an electrolyte level in a battery cell and generating an indication of a fault condition when the electrolyte level drops below a predetermined acceptable level. The system may comprise a controller, an ultrasonic transmit circuit for transmitting an ultrasonic signal into an interior area of the battery cell, and an ultrasonic receive circuit. The ultrasonic receive circuit may be used for receiving the ultrasonic signal after it has been reflected from the interior area of the battery cell. The controller may be configured to use the reflected ultrasonic signal and a predetermined calibration signal representing the predetermined acceptable level of the electrolyte to determine when the electrolyte level has dropped below the predetermined acceptable level.

In another aspect the present disclosure relates to a system for monitoring an electrolyte level in a battery cell and generating an indication of a fault condition when the electrolyte level drops below a predetermined acceptable level. The system may comprise a microcontroller, an ultrasonic transmit circuit for transmitting ultrasonic signal pulses into an interior area of the battery cell, and an ultrasonic receive circuit. The ultrasonic receive circuit may be used for receiving the ultrasonic signal pulses after the electronic signal pulses have been reflected from the interior area of the battery cell. The microcontroller may be configured to perform a plurality of operations that involve converting each one of the reflected ultrasonic signal pulses into a calibration data sample during a calibration procedure to construct a calibration signature waveform; converting each one of the reflected ultrasonic signal pulses into a test data sample during a test procedure to construct a test signature waveform; and using the reflected ultrasonic signal to create a predetermined calibration signature waveform. The predetermined calibration signature waveform may represent the predetermined acceptable level of the electrolyte. The microcontroller may also use the received ultrasonic signal to construct a test signature waveform representative of a real time electrolyte level within the battery cell. The microcontroller may use the test and calibration signature waveforms to detect, in real time, when the electrolyte level within the battery has dropped below the predetermined acceptable level.

In still another aspect the present disclosure relates to a method for monitoring an electrolyte level in a battery cell and generating an indication of a fault condition when the electrolyte level drops below a predetermined acceptable level. The method may comprise transmitting a first plurality of ultrasonic signals and receiving a first plurality of reflected ultrasonic signals. The first plurality of reflected ultrasonic signals may be used to construct a calibration signature representative of a condition where the electrolyte level is at least at the predetermined acceptable level. A second plurality of ultrasonic signals may be transmitted and received to create a second plurality of reflected ultrasonic signals. The second plurality of reflected ultrasonic signals may be used to construct a test signature representative of an actual level of the electrolyte within the battery cell. The calibration and test signatures may be used to determine when the electrolyte level in the battery cell drops below the predetermined acceptable level.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

FIGS. 3A and 3B are oscilloscope traces showing the reflection of an ultrasonic signal from an interface between an inner wall of a battery cell and electrolyte in a battery cell when the battery cell has a full electrolyte level and from an interface between an inner wall of the battery cell and air when the battery cell has a low electrolyte level;

DETAILED DESCRIPTION

Example embodiments will now be described more fully with reference to the accompanying drawings.

Figure 1:
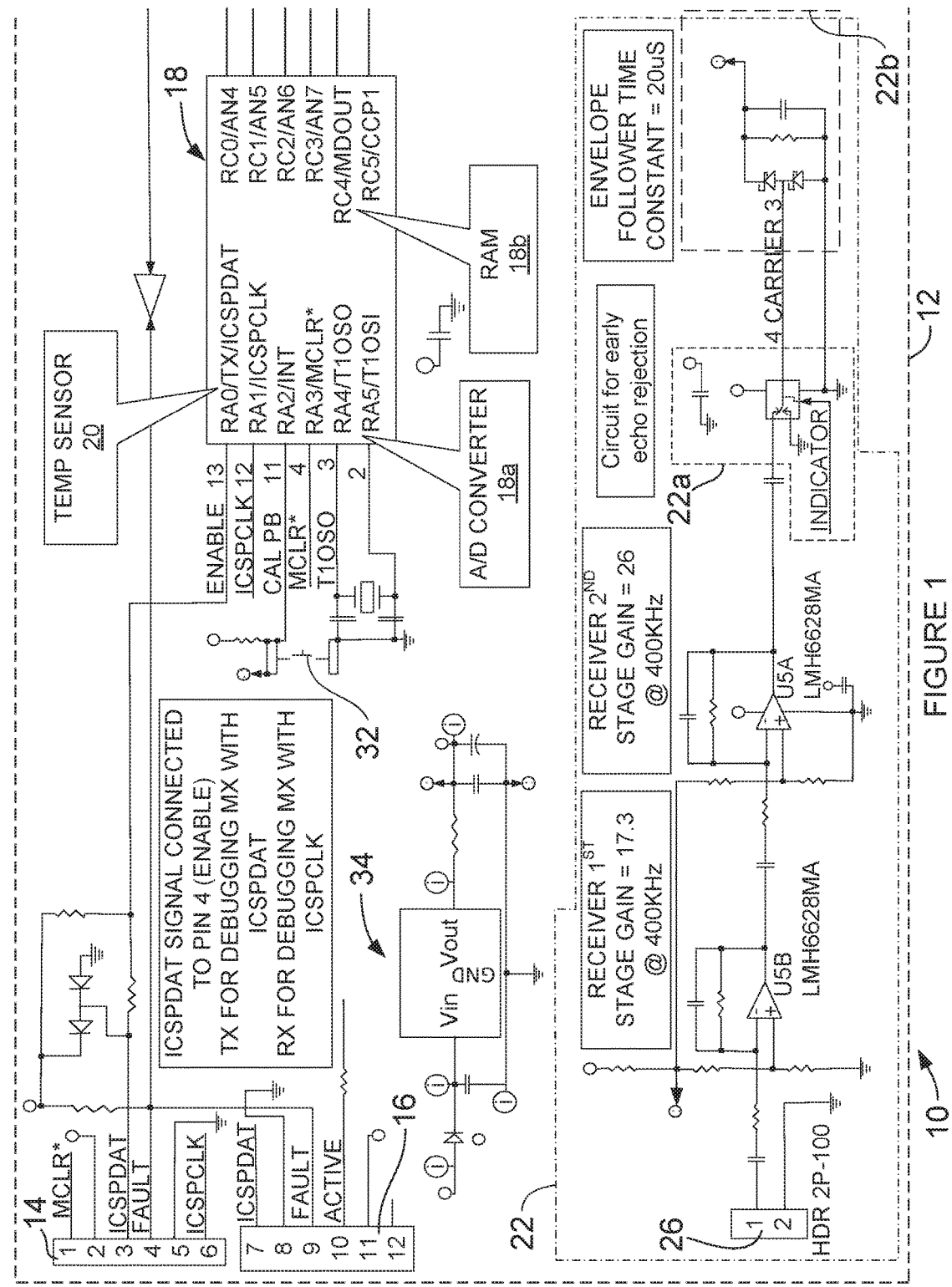
FIG. 1 is a schematic of a circuit topology of an ultrasonic electrolyte sensor in accordance with an aspect of the present disclosure.
Figure 1A:
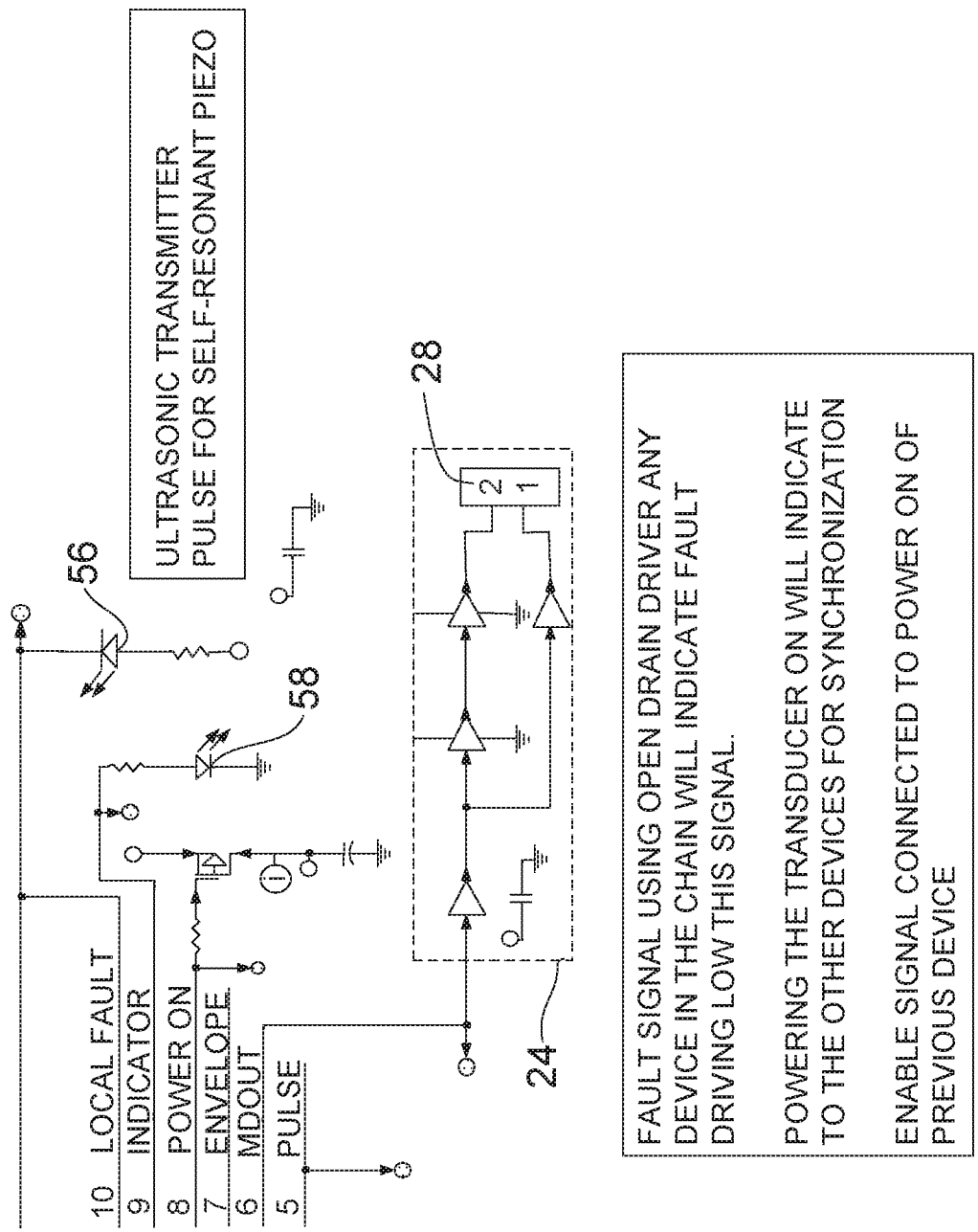

FIG. 1 is a schematic of an illustrative circuit topology for an ultrasonic electrolyte level sensor system 10 (hereinafter "the system 10") in accordance with an aspect of the present disclosure. The system 10 of FIG. 1 may illustratively include a printed circuit board 12 propagated with a plurality of components for creating a highly sensitive, ultrasonic electrolyte sensor.

The components of the system 10 may include a data input port 14 and a data output port 16s. The input and output ports 14 and 16, respectively, may be RJ-11 ports or they may take any other suitable form. The system 10 also may include a controller, for example a microcontroller 18, having an analog-to-digital converter ("ADC") 18a and a random access memory ("RAM") 18b. The microcontroller 18 may be in communication with the ports 14 and 16. The microcontroller 18 may have a built in temperature sensor 20, the operation of which will be described in greater detail in the following paragraphs.

The microcontroller 18 may be in communication with an ultrasonic receiver circuit 22 and with an ultrasonic transmitter circuit 24. The ultrasonic receiver circuit 22 includes an ultrasonic transducer 26, such as a 400 kHz piezo electric ultrasonic transducer, and the ultrasonic transmitter circuit includes an ultrasonic transducer 28, such as a 400 kHz piezo electric ultrasonic transducer. The ultrasonic receiver circuit 22 may also include an echo detection circuit 22a and an envelope follower circuit 22b. A calibration pushbutton 32 may be provided to enable an individual to initiate a calibration procedure for the system 10. A voltage regulator 34 is included to supply a regulated DC voltage to the components of the system 10 that require electrical power for their operation.

Figure 2:
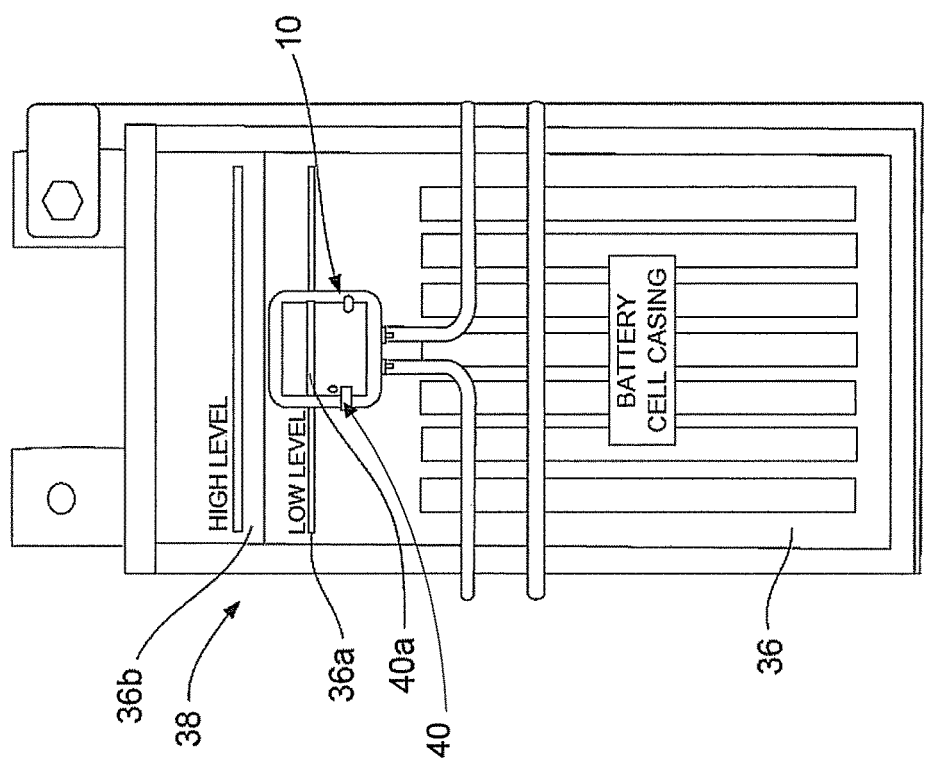
FIG. 2 is a perspective view showing the ultrasonic electrolyte sensor of FIG. 1 mounted to a case of a battery cell.

FIG. 2 shows the system 10 mounted to a case (i.e., housing) 36 of a battery cell 38. It will be appreciated that the case 36 will typically have a "Low" and "High" electrolyte level markings on it, identified in FIG. 2 by reference numbers 36a and 36b, respectively that allow an individual to visually determine what level the electrolyte level is at. The system 10 may include a suitable housing 40 in which the PCB board 12 and its associated components are housed. The system 10 may be mounted to the battery cell case 36 so that the ultrasonic receive transducer 26 and the ultrasonic transmit transducer 28 face the battery cell 38 case at a desired position on a sidewall of the case 36 to be able to detect a low electrolyte level condition within the battery cell 38. In one specific implementation this may be accomplished by providing a line 40a (FIG. 2) or other demarcation on the housing 40 which may be aligned with the "Low" electrolyte level marking when the housing 40 is physically secured to the case 36. The line 40a is at a location on the housing 40, relative to the positioning of the transmit and receive transducers 26 and 28, which is predetermined to result in a "Low" electrolyte level signal from the system 10 if the electrolyte level in the battery case 36 falls to (or below) the "Low" level marking 36a on the battery case 36. The housing 40 may be secured to the battery case 36 by any suitable means, but in one preferred form is secured with an adhesive. One specific adhesive that may be preferred is VHB 4910 bonding tape available from 3M Corporation. Similarly the ultrasonic transducers 26 and 28 may themselves be secured with a suitable adhesive tape, such as VHB 4910, to an interior surface of the housing 40 of the system 10. Whatever means is used to secure the housing 40 to the battery case 36, as well as the transducers 26 and 28 to the interior surface of the housing 40, a highly important consideration is that an excellent "coupling" is achieved to minimize reflections of the ultrasonic signal that is reflected back as a result of the housing 40 to housing 36 connection.

The microcontroller 18 of the system 10 may be programmed to control the overall operation of the system, as described below. It should be understood that control devices other than microcontrollers could be used, such as ASIC's and microprocessor systems. The system 10 may include a "monitoring" mode where it tests the electrolyte level in the battery cell 38 to see if it is at or below a "low" level (i.e., below "Low" level mark 36a on the battery case 36). The system 10 may also include a "calibration" mode where it establishes a signal that corresponds to a "norm" condition for the battery cell 38. The norm condition may be represented by a reflected ultrasonic signal that is present when the electrolyte level corresponds to the "Full" level marking 36b on the battery case 36. Thus, the norm condition may be viewed as a "Full" condition for the electrolyte level in the battery 38.

In the monitoring mode the system 10 periodically tests the battery cell 38 to determine if the electrolyte level in the battery cell has fallen below the Low mark 36a on the battery case 36. For example, the system 10 may test the battery cell 38 every 5-30 seconds, and in one preferred implantation every 10 seconds. It should be understood that ten seconds is just one example, and other time intervals could just as easily be used.

When the system 10 tests the battery cell 38 it generates a short ultrasonic test signal that is transmitted by the ultrasonic transmit transducer 28. The ultrasonic signal from the ultrasonic transmit transducer 28 is directed at the battery cell case 36 so that the ultrasonic signal irradiates a swath between the High electrolyte level mark 36b and the Low electrolyte level mark 36a. The ultrasonic test signal may be a strong 400 kHz signal, illustratively a burst between 2.5 and 10 microseconds. It may be, for example, a 2.5 microsecond burst, which is one cycle. The ultrasonic test signal may be referred to herein as a "ping." The transmitted ultrasonic signal is reflected back by the electrolyte within the battery cell case 36 and received by the ultrasonic receive transducer 26. The received ultrasonic signal may be used by the microcontroller 18 to determine if the electrolyte level is low. In the embodiment of FIG. 1, the transmit and receive ultrasonic transducers 28 and 26, respectively, are preferably separate transducers to reduce residual ringing in their respective ultrasonic transmit elements. It should be understood, however, that the same ultrasonic transducer can be used as both the ultrasonic transmit transducer and the ultrasonic receive transducer. To eliminate the "echo" that may result from the transmitted ultrasonic signal being reflected back from the sensor's plastic case 36, the echo rejection circuit 22a and the envelope follower circuit 22b may be used to remove, for example, the first 10 µs of the reflected ultrasonic signal that is detected by the ultrasonic receive transducer. This early echo is high in amplitude and could have a significant impact on the envelope obtained. The echo rejection needs to be performed before the envelope is obtained in order to acquire an envelope that corresponds only to the signal reflected from the electrolyte or air interface with the battery cell case 36. The reflected ultrasonic signal from the electrolyte within the battery case 36 (with any echo component removed) is then compared to the value representing the norm, which may be stored in a memory such as an EEPROM, so it can be used after a power or reset cycle associated with the microcontroller 18. If the reflected ultrasonic signal deviates sufficiently from the norm, the microcontroller 18 determines that the electrolyte level in the battery cell is at or below a predetermined acceptable level (i.e., at or below the predetermined "Low" level).

The case 36 of the battery cell 38 may be a plastic case. When the electrolyte level in the battery cell 38 is at or above the norm level (i.e., the Full level 36b), there will be a plastic/electrolyte interface at an inner wall of the battery cell case that is impinged by the transmitted ultrasonic test signal directed at the battery cell 38. When the battery cell 38 has a low electrolyte level, there will be a plastic/air interface at the inner wall of the battery cell case 36 that is impinged by the ultrasonic test signal transmitted at the battery cell. The plastic/electrolyte interface has a lower reflection coefficient compared to the plastic/air interface, resulting in more ultrasonic energy being transmitted forward into the battery and less ultrasonic energy being reflected back to the ultrasonic receive transducer 26. Conversely, the comparatively higher reflection coefficient of the plastic/air interface results in more ultrasonic energy being reflected back to the ultrasonic receive transducer 26 and less energy being transmitted forward into the battery cell 38. Thus, the ultrasonic signal reflected by the interface at the inner wall of the battery cell case 36 has more energy when the battery cell 38 has a low electrolyte level and will have a higher magnitude than the ultrasonic signal reflected by the interface at the inner wall of the battery cell case 36 when the battery cell has a full electrolyte level.

Figure 3A:
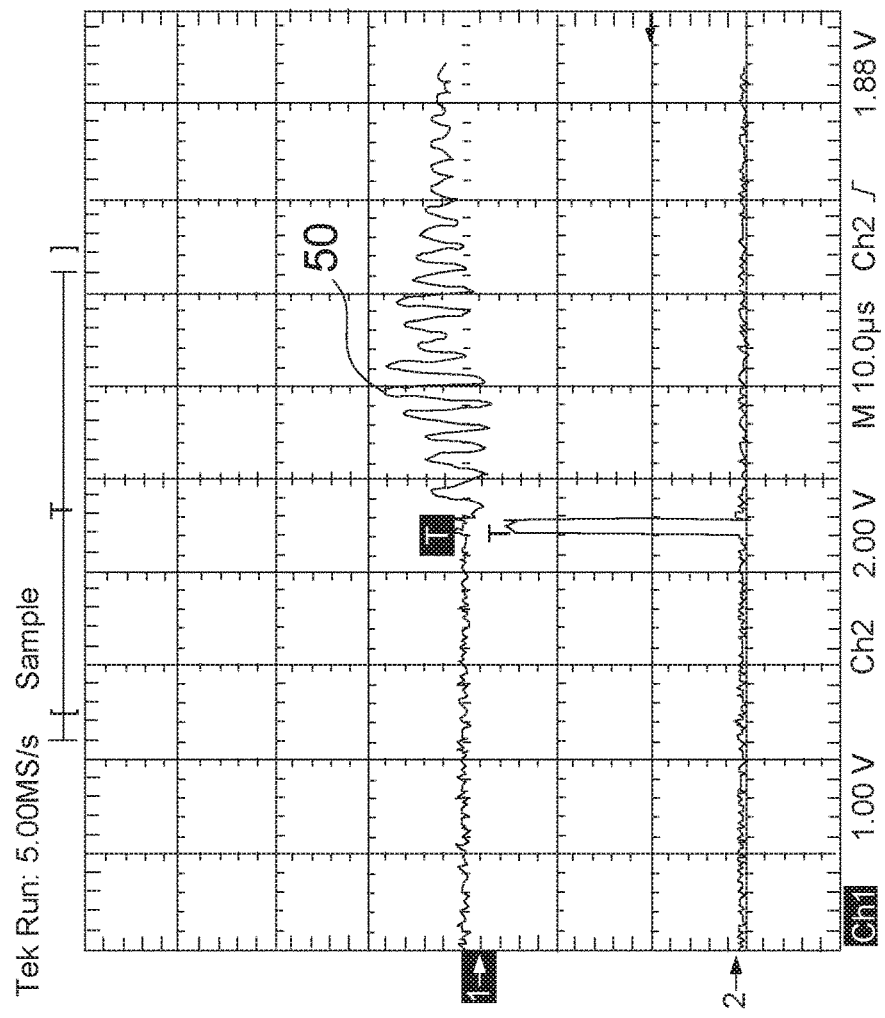

FIG. 3A shows an ultrasonic signal 50 reflected by the interface at the inner wall/electrolyte interface of the battery cell case 36 when the battery cell 38 has a full electrolyte level. FIG. 3B shows an ultrasonic signal 52 generated by the interface of the inner wall of the battery cell case 36 and air when the battery cell 38 has a low electrolyte level. The microcontroller 18 thus determines that the electrolyte in the battery cell 38 is low when the magnitude of the reflected ultrasonic signal is a certain predetermined percentage above the magnitude that corresponds to the previously determined signal value for the norm (i.e., "Full) condition, as described above. Illustratively, the microcontroller 18 determines that the electrolyte level in the battery cell 38 is low when the reflected ultrasonic signal is at least fifty percent above the signal level that has been predetermined for the norm electrolyte level. In an example, the microcontroller 18 determines that the electrolyte level in the battery cell 38 is low when the reflected signal is at least 300 millivolts above the signal level that has been predetermined to correspond to the norm condition. In this example, then, the 300 mv value would correspond to the predetermined acceptable level of the electrolyte (i.e., the "Low" level 36a). It should be understood that the predetermined voltage level may be determined heuristically and may be higher or lower than fifty percent or 300 millivolts.

The reflected ultrasonic signal received by the receive ultrasonic transducer 26 may be amplified, demodulated, and presented to the ADC 18a, which may be part of the microcontroller 18 or it may be an independent component. For convenience, the ADC 18a is shown in FIG. 1 as being part of the microcontroller 18. A plurality of samples are taken with the ADC 18a to obtain a plurality of digital test data points and the resulting digital test data points stored in a memory, such as the RAM 18b of the microcontroller 18. The digital test data points represent a signature of the actual reflected ultrasonic signal. This test signature (that is, the digital test data points) is then compared to the signature that corresponds to the norm condition. Again, the norm condition is represented by a signature of a reflected ultrasonic signal of the battery cell 38 in a known good (i.e., electrolyte "Full" condition). If the test signature deviates sufficiently from the signature corresponding to the norm condition, the microcontroller 18 determines that the electrolyte level in the battery cell 38 is low. The test signature for the norm condition may be programmed into the microcontroller 18 (i.e., stored in the RAM 18b) or it may be obtained by a calibration routine, discussed below. As discussed in more detail below, the norm condition may be represented by a set of digital data points that collectively represent a signature of a reflected ultrasonic wave of the battery cell 38 obtained by testing the battery cell when it is in a known, full electrolyte condition.

The reflected ultrasonic signal (after amplification and demodulation and echo removal) may be sampled with the ADC 18a every 11.5 microseconds to obtain a suitable number of test samples, and in this example seven such test samples. Sampling may illustratively start 10 microseconds after the ping. It should be understood that sampling can occur at periods of other than 11.5 microseconds and that other than seven samples can be taken. Also, a test may include a plurality of pings and subsequent test samples. By way of example and not of limitation, a test may include sixteen pings with seven samples taken after each ping. The corresponding samples taken after each ping may then be averaged to generate a set of seven test data points, also referred to as a test signature, with each test data point being the average of the corresponding samples taken after each of the sixteen pings. That is, the first sample obtained after each of the sixteen pings are averaged, the second sample obtained after each of the sixteen pings are averaged, and so on.

In an aspect, the system 10 has a calibration mode in which it is calibrated to obtain the norm, illustratively a calibration signature, against which the comparison of the test data is made. The temperature sensor 20 associated with the microcontroller 18 may be used to sense the temperature of the microcontroller 18 and/or the ambient environment in which the system 10 is being used, and to provide a sensed temperature value to the microcontroller 18 that it may use to compensate for temperature conditions that may affect the magnitude of the reflected ultrasonic signal. There is a high correlation between the surrounding temperature and the amplitude of the reflected signal. By using the temperature sensor 20 embedded in the microcontroller 18 to acquire the temperature, the signal amplitude is compensated for every sample in real-time. This compensation is performed for the test signal as well as for the calibration (or normal) signal. The microcontroller 18 may also include firmware that includes a suitable algorithm for making an automatic noise level determination, which in turn allows an automatic fault level sensitivity adjustment to be made by the microcontroller 18. The fault level sensitivity adjustment may be used to compensate for excessive humidity or dryness that the sensor 10 is experiencing that would otherwise affect the magnitude of the reflected ultrasonic signal that is received by the receive ultrasonic transducer 28. In this regard it will be appreciated that the magnitude of the reflected signal may be affected by extremes of humidity or dryness, which effectively influences the quality of the "coupling" that is achieved between the sensor housing 40 and the battery case 36.

Figure 4:
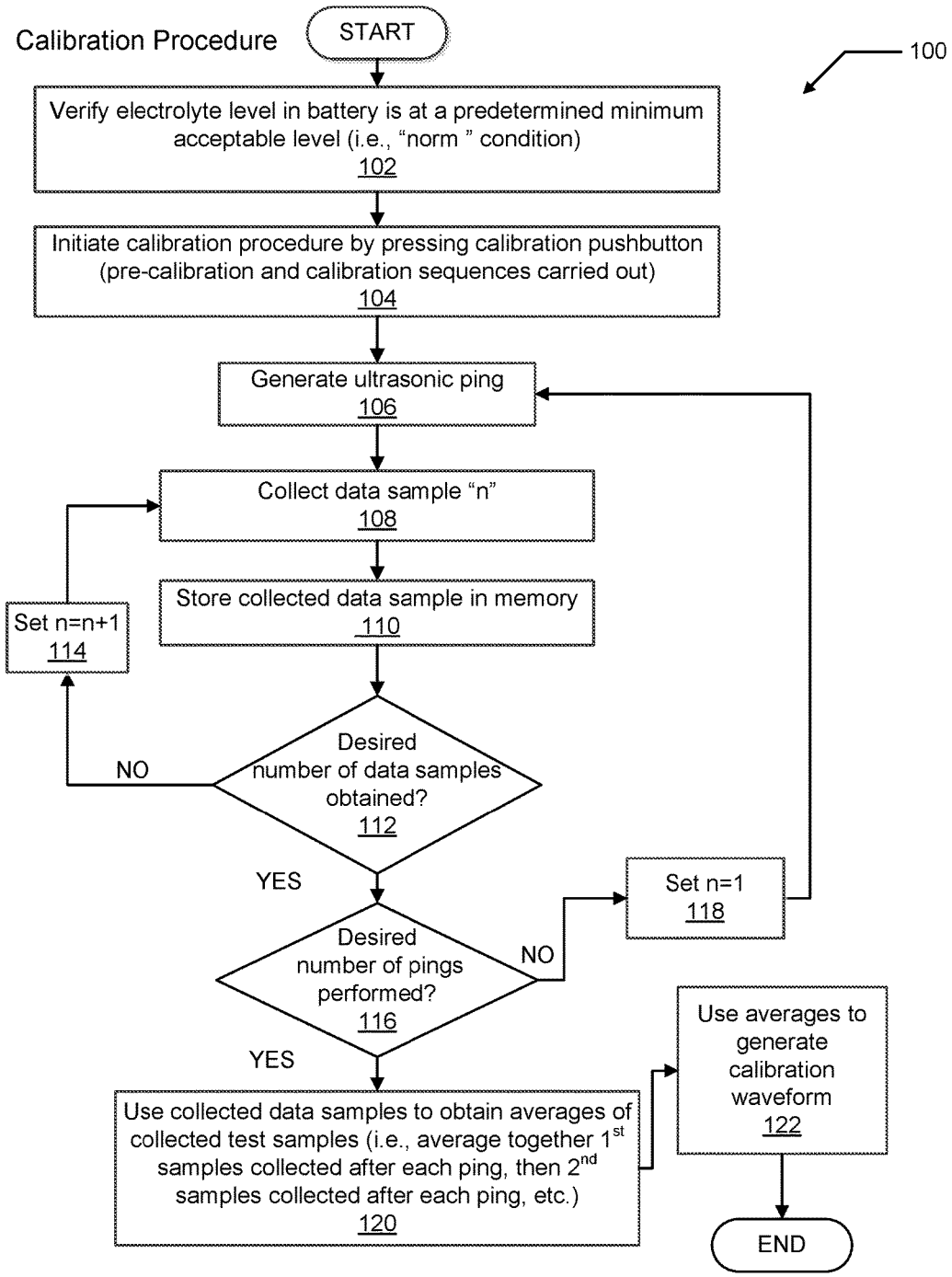
FIG. 4 is a flowchart illustrating various operations that may be performed by the system of FIG. 1 during a calibration procedure.

Referring to FIG. 4, a flowchart 100 illustrates one example of various operations that may be performed during the calibration mode. The calibration mode is only initiated after visually verifying that the battery cell 38 is in a known good condition, that is, having its electrolyte level at least at the predetermined acceptable level, as indicated at operation 102. At operation 104 the calibration mode may then be entered by pressing the calibration pushbutton 32 shown in FIG. 1. The calibration mode may involve initially executing a coupling test pursuant to a coupling test mode. The coupling test mode makes a preliminary check of the quality of the acoustic coupling between the sensor's 10 housing 40 and the housing 36 of the battery cell 38. During the coupling test mode a check is made of the magnitude of the reflected signal emitted from the ultrasonic transmit transducer 28. If the magnitude of the reflected signal received by the receive transducer 26 is too far above a predetermined upper limit (e.g., 520 mv) then a full calibration operation is not performed. In this instance a red "Fault" LED 56 may be turned on, which indicates that the physical coupling between the housing 40 and the battery case 36 is unsatisfactory to enable a proper calibration to be performed. If the magnitude of the reflected signal is below the predetermined upper limit, then the calibration mode will continue.

During calibration the ultrasonic ping described above is generated and transmitted into the battery cell 38 as indicated at operation 106. A first data sample is then obtained at operation 108. During operation 108 the reflected ultrasonic signal representing the first data sample is amplified, demodulated, and presented to the ADC 18a. The data sample thus is converted to a corresponding digital value. The just-obtained data sample may then be stored in memory (e.g., RAM 18b), as indicated at operation 110. A check may then be made if the desired number of data samples has been obtained, as indicated at operation 112. If not, then a counter is incremented at operation 114 and operations 108-112 are repeated. If the check at operation 112 indicates that the desired number of data samples has been obtained (in this example 7 such data samples), then a check is made at operation 116 to determine if the predetermined number of ultrasonic pings has been performed. If not, then the data sample counter is reset to "1" as indicated at operation 118 and operations 106-112 are re-performed for the next generated ping.

If the check at operation 116 indicates that the predetermined number of ultrasonic pings has been performed, then the collected data samples are averaged together at operation 120. This may involve averaging all of the $1^{st}$ data samples collected after each ultrasonic ping to obtain an average of the $1^{st}$ group of data samples, and then averaging all of the $2^{nd}$ data samples collected after each ultrasonic ping to obtain an average of all the $2^{nd}$ data samples collected, and so forth. When the averaging is completed an average data sample value will exist for each of the data samples collected. So if seven data samples were collected after each ultrasonic ping, operation 120 would create seven average data sample values, with each average value representing the average of those data samples collected at specific points in the data collection sequence.

The digital data points corresponding to the stored data samples are used to construct a signature that is used to represent the norm condition, that is, a signature that represents the battery cell 38 in a known good condition. It should be understood that preferably the same number of pings are made and samples taken in the calibration procedure as in actual testing. Thus in the above described example in which four pings are used followed by seven data samples (and where the corresponding samples after each of the four pings are averaged) after each ping, this preferably occurs both in the calibration mode and then when an actual test is conducted. The calibration mode allows a "calibration signature" (i.e., waveform) to be created that represents the norm condition and which takes into account the electrical characteristics of the particular battery cell, and thus "calibrates" the system 10 for use with the particular battery cell that it is being used to monitor. When this same sequence of operations is performed during actual testing, a "test signature" is created (i.e., a waveform represented by the collected data samples obtained). It will also be appreciated that when a calibration is initiated, the microcontroller 18 may also clear any fault conditions and any previous calibration signature may be replaced with a new calibration signature.

Figure 5:
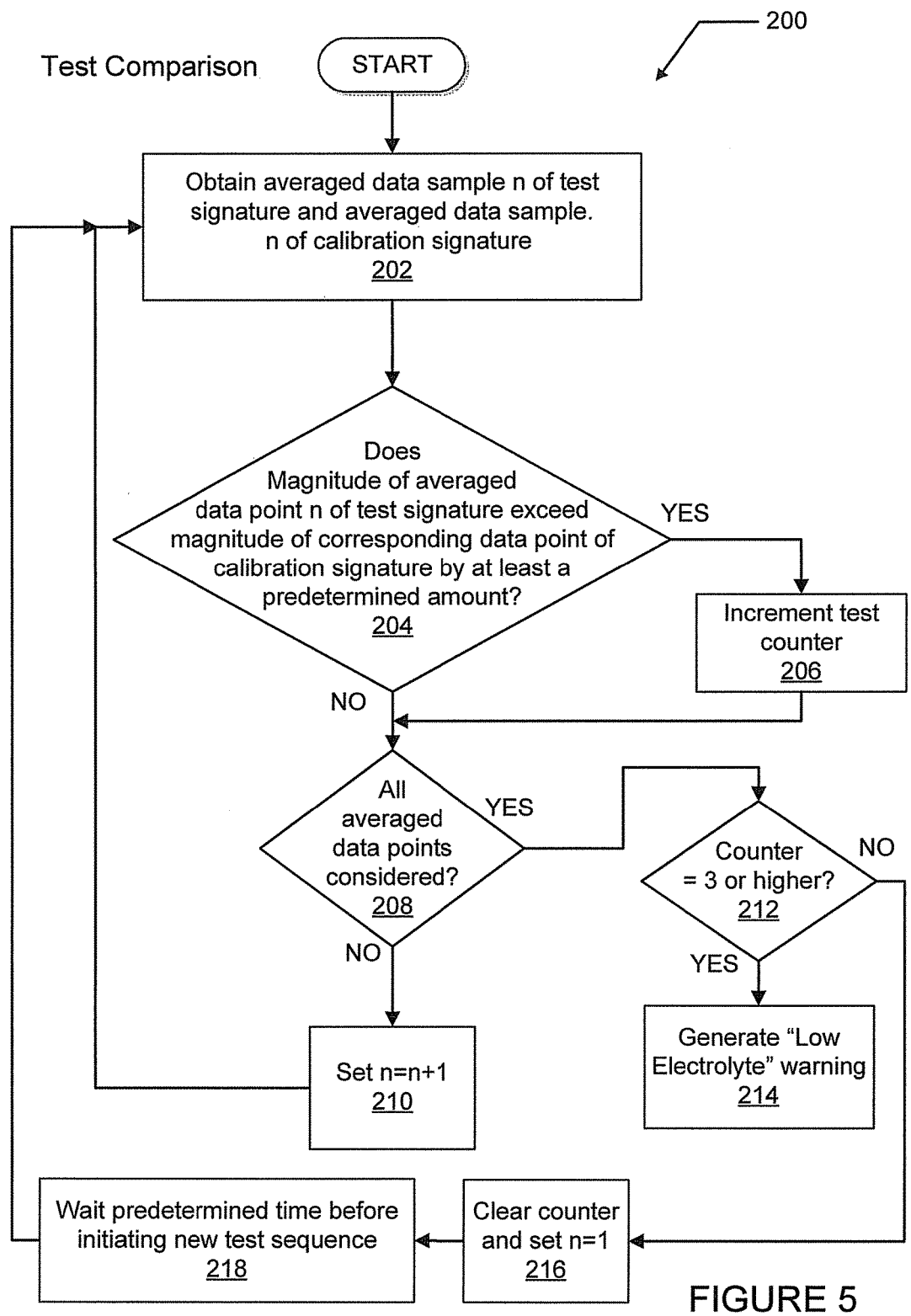
FIG. 5 is a flowchart illustrating various operations that may be performed by the system in determining if an electrolyte level of the battery it is being used to monitor is at least at a predetermined acceptable level.

One example of a test sequence for the battery cell 38 is shown in the flowchart 200 of FIG. 5. When testing the battery cell 38, the microcontroller 18 may initially obtain a first one of the averaged data samples used to construct the calibration waveform, as well as a first one of the averaged data samples used to construct the just-obtained test signature, as indicated at operation 202. At operation 204 the microcontroller 18 may perform a comparison of the magnitudes of the first averaged test samples of each of the calibration and test signatures to determine if the data sample of the test signature exceeds that of the calibration signature by at least a minimum predetermined amount (e.g., 300 mv or more). If so, a software test counter may be incremented by the microcontroller 18 at operation 206. If not, then a check may be made by the microcontroller 18 if all of the data samples (seven in this example) have been checked, as indicated at operation 208. If the check at operation 208 produces a "No" answer, then n is incremented and operations 202-204 are repeated by the microcontroller 18 with the next averaged data sample for each of the test and calibration signatures.

If the test at operation 208 indicates that all of the averaged data samples have been considered (i.e., in this example all seven averaged data samples), then a check is made by the microcontroller 18 to determine if the test counter is at or exceeds a predetermined value, which in this example is "3" or higher. The microcontroller 18 determines that the electrolyte level is below the norm condition when, for example, three of the seven comparisons described above show that the averaged data sample of the test signature is higher by the predetermined amount (e.g., 300 mv) than the corresponding averaged data sample of the calibration signature. When this condition is present the microcontroller 18 may generate a signal that illuminates the fault LED 56 to indicate a "Low Electrolyte" level. However, if the check at operation 212 indicates that the test counter is not at a value of three or higher, then the microcontroller 18 may clear the test counter and set the data sample n value back to "1", as indicated at operation 216. The microcontroller 18 may then wait a predetermined time period (e.g., 10 minutes), as indicated at operation 218, before repeating the entire test sequence shown in the flowchart 200.

As long as the system 10 is receiving power, the green LED 58 may be powered on. During normal monitoring the green LED 58 may be controlled by the microcontroller 18 to blink at a first rate or frequency. As a measurement is being obtained by the system 10, the green LED 58 may be controlled to remain illuminated. This provides an immediate visual clue to the user that the system 10 is functioning as intended.

It should also be understood that different comparison sequences could be implemented other than the "three of seven" comparison sequence described above, when making the determination if the electrolyte level is at the norm condition. The fault LED 56 has been described as being red in color, although any other color could be used. The fault LED 56 alerts a user to the fault condition. If the electrolyte level is determined to be at least at the norm condition, then the fault LED 56 remains off. The microcontroller 18 may also transmit data, such as the test signatures and fault status, to a host via the data output transmission port 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for monitoring an electrolyte level in a battery cell and generating an indication of a fault condition when the electrolyte level drops below a predetermined acceptable level, the system comprising:
   a housing adapted to be fixedly secured to an exterior surface of the battery cell;
   a controller housed in the housing;
   an ultrasonic transmitter circuit, housed in the housing, for transmitting an ultrasonic signal into an interior area of the battery cell;
   an ultrasonic receive circuit, housed in the housing, for receiving the ultrasonic signal after it has been reflected from the interior area of the battery cell; and
   the controller configured to use the reflected ultrasonic signal and a predetermined calibration signal representing the predetermined acceptable level of the electrolyte to determine when the electrolyte level has dropped below the predetermined acceptable level; and
   wherein the controller is configured to obtain a plurality of calibration data samples to construct a calibration signature, and to obtain a plurality of test data samples to construct a test signature, and to compare the calibration signature with the test signature to determine if the electrolyte level is at least at the predetermined acceptable level.

2. The system of claim 1, wherein the reflected ultrasonic signal has a magnitude that varies depending on whether the transmitted ultrasonic signal impinges an interface comprised of:
   a case of the battery cell and the electrolyte; and
   a case of the battery cell and air.

3. The system of claim 1, wherein the controller is further configured to
   average a series of the calibration data samples to obtain a plurality of averaged calibration data samples that are used to construct the calibration signature corresponding to the predetermined acceptable level of the electrolyte.

4. The system of claim 3, wherein the controller is configured to implement a test procedure to use the ultrasonic transmit and ultrasonic receive circuits to:
   obtain a series of test data samples in response to a series of ultrasonic signal bursts; and
   to average the obtained series of test data samples to obtain a plurality of averaged test data samples that are used to construct a test signature corresponding to an actual level of the electrolyte in the battery cell.

5. The system of claim 1, further comprising:
   a light emitting diode (LED), and the controller configured to generate a signal to illuminate the LED when the electrolyte level is detected to be below the predetermined acceptable level; and
   an input port and an output port for enabling the controller to communicate with a remote subsystem.

6. The system of claim 1, wherein the ultrasonic receive circuit includes an echo detection circuit for detecting and removing an echo to the reflected ultrasonic signal.

7. A system for monitoring an electrolyte level in a battery cell and generating an indication of a fault condition when the electrolyte level drops below a predetermined acceptable level, the system comprising:
   a housing configured to be fixedly secured to an exterior surface of the battery cell;
   a microcontroller housed in the housing;
   a transmit ultrasonic circuit, housed in the housing, for transmitting ultrasonic signal pulses into an interior area of the battery cell;
   a receive ultrasonic circuit, housed in the housing, for receiving the ultrasonic signal pulses after the ultrasonic signal pulses have been reflected from the interior area of the battery cell;
   the microcontroller configured to:
      convert each one of the reflected ultrasonic signal pulses into a calibration data sample during a calibration procedure to construct a calibration signature waveform representing the predetermined acceptable level of the electrolyte;
      convert each one of the reflected ultrasonic signal pulses into a test data sample during a test procedure to construct a test signature waveform, which is representative of a real time electrolyte level within the battery cell;
      to use the test and calibration signature waveforms to detect, in real time, when the electrolyte level within the battery cell has dropped below the predetermined acceptable level.

8. The system of claim 7, wherein the microcontroller comprises an analog-to-digital converter for converting each said reflected ultrasonic signal pulse, obtained subsequent to each said transmitted ultrasonic signal pulse, into a digital value, to be used in constructing at least one of the calibration and test signature waveforms.

9. The system of claim 8, further comprising a control for enabling a user to initiate the calibration procedure to obtain the calibration signature waveform.

10. The system of claim 9, wherein the control comprises a pushbutton for providing a signal to the microcontroller to initiate the calibration procedure.

11. The system of claim 7, further comprising an electrical input port and an output port both in communication with the microcontroller.

12. The system of claim 7, further comprising a light emitting diode (LED) responsive to a signal from the microcontroller to provide a visual warning to a user when the electrolyte level is detected to have fallen below the predetermined acceptable level.

13. A method for monitoring an electrolyte level in a battery cell and generating an indication of a fault condition when the electrolyte level drops below a predetermined acceptable level, the method comprising:
- transmitting a first plurality of ultrasonic signals from within a housing, wherein the housing is fixedly secured to the battery cell, and receiving a first plurality of reflected ultrasonic signals;
- using the first plurality of reflected ultrasonic signals to construct a calibration signature representative of a condition where the electrolyte level is at least at a predetermined acceptable level;
- transmitting a second plurality of ultrasonic signals and receiving a second plurality of reflected ultrasonic signals;
- using the second plurality of reflected ultrasonic signals to construct a test signature representative of an actual level of the electrolyte within the battery cell; and
- using the calibration and test signatures to determine when the electrolyte level in the battery cell drops below the predetermined acceptable level.

14. The method of claim 13, wherein said using the calibration and test signatures comprises making at least one comparison of the calibration and test signatures.

15. The method of claim 14, wherein said making at least one comparison comprises making a plurality of comparisons.

16. The method of claim 14, wherein:
- said constructing the calibration signature comprises converting ones of the first plurality of reflected ultrasonic signals to first digital values to construct a calibration signal waveform; and
- said constructing the test signature comprises converting ones of the second plurality of reflected ultrasonic signals to second digital values to construct a test signal waveform.

17. The method of claim 16, further comprising:
- averaging the first digital values to create a first plurality of averaged data samples; and
- averaging the second digital values to create a second plurality of averaged data samples; and
- wherein the making a comparison comprises making a sequence of comparisons of the specific ones of the first plurality of averaged data values with specific ones of the second plurality of average data values.

18. A system for monitoring an electrolyte level in a battery cell and generating an indication of a fault condition when the electrolyte level drops below a predetermined acceptable level, the system comprising:
- a housing adapted to be fixedly secured to an exterior surface of the battery cell;
- a controller housed in the housing;
- an ultrasonic transmitter circuit, housed in the housing, for transmitting an ultrasonic signal into an interior area of the battery cell;
- an ultrasonic receive circuit, housed in the housing, for receiving the ultrasonic signal after it has been reflected from the interior area of the battery cell;
- the controller configured to use the reflected ultrasonic signal and a predetermined calibration signal representing the predetermined acceptable level of the electrolyte to determine when the electrolyte level has dropped below the predetermined acceptable level;
- wherein the controller is configured to implement a calibration procedure to use the ultrasonic transmit and ultrasonic receive circuits to:
  - obtain a series of calibration data samples in response to a series of ultrasonic signal bursts; and
  - to average the obtained series of calibration data samples to obtain a plurality of averaged calibration data samples that are used to construct a calibration signature corresponding to the predetermined acceptable level of the electrolyte.

* * * * *